(12) United States Patent
Riede

(10) Patent No.: US 8,102,990 B2
(45) Date of Patent: Jan. 24, 2012

(54) METHOD FOR SETTING UP A COMMUNICATION CONNECTION AND A PRIVATE BRANCH EXCHANGE FOR CARRYING OUT THE METHOD

(75) Inventor: Sven Riede, Bargteheide (DE)

(73) Assignee: Avaya Inc., Basking Ridge, NJ (US)

( * ) Notice: Subject to any disclaimer, the term of this patent is extended or adjusted under 35 U.S.C. 154(b) by 204 days.

(21) Appl. No.: 12/336,739

(22) Filed: Dec. 17, 2008

(65) Prior Publication Data

US 2009/0185671 A1 Jul. 23, 2009

(30) Foreign Application Priority Data

Jan. 23, 2008 (EP) ..................................... 08001162

(51) Int. Cl.
*H04M 3/00* (2006.01)
*H04M 7/00* (2006.01)
(52) U.S. Cl. .......................... 379/258; 379/232; 379/233
(58) Field of Classification Search ................... 379/231, 379/232, 233, 234, 258
See application file for complete search history.

(56) References Cited

U.S. PATENT DOCUMENTS

2002/0136386 A1\* 9/2002 Berger ........................... 379/219

FOREIGN PATENT DOCUMENTS

| EP | 1435722 A2 | 7/2004 |
| EP | 1209925 A3 | 5/2006 |

\* cited by examiner

*Primary Examiner* — Harry Hong
(74) *Attorney, Agent, or Firm* — Sheridan Ross P.C.

(57) ABSTRACT

A method for setting up a communication connection between a calling communication terminal and another communication terminal belonging to a group in a communication network selected by the calling party dialing an allocated group telephone number, the other communication terminal being selected by an exchange unit of the selected communication network by means of availability information, and the connection initiated through the exchange of a start message and a number of connection confirmation messages between the calling communication terminal and the selected other communication terminal. A private branch exchange with a server which comprises an exchange unit and to which a plurality of communication terminals combined in groups is connected, carries out the method. The server sets up communication connections with selected communication terminals through the exchange of a start message and a number of connection confirmation messages between a calling communication terminal and the respective selected communication terminal.

4 Claims, 1 Drawing Sheet

METHOD FOR SETTING UP A COMMUNICATION CONNECTION AND A PRIVATE BRANCH EXCHANGE FOR CARRYING OUT THE METHOD

FIELD OF THE INVENTION

The invention relates to a method for setting up a communication connection between a calling communication terminal and another communication terminal belonging to a group in a communication network and a private branch exchange with a server for carrying out the method.

BACKGROUND OF THE INVENTION

In modern private branch exchanges or telephone installations or systems, such as call centers, usually a plurality of telephony or communication terminals are connected to a central exchange unit, via telecommunication connections which are set up between individual communication terminals or also between calls coming in from outside the internal telephone network and selected communication terminals. Within the framework of these telecommunication connections, voice data or user data are transmitted to the respective selected telephony terminal and/or from the latter to the central exchange unit and from the central exchange unit to the respective terminal. The data can be transmitted in the conventional manner or else using an Internet Protocol.

In relatively complex telephone installations or systems, such as in call centers or the like, or in telephone systems in enterprises or organizational units, where the called communication terminal is not necessarily selected because of the person or the respective user, but because of the latter's subject-matter qualification or competence, the communication terminals can be organized or combined in groups, whereby a group telephone number selectable by the calling party can be allocated to each group. For example, in a call center, a group of communication terminals can be provided for the "Sales" function, a calling party or customer selecting a central telephone number provided for Sales and then being put through by an allocated exchange unit of the communication network to a communication terminal allocated to this group, to which a Sales employee can be reached. All communication terminals allocated to the respective group report their current availability to the exchange unit by means of their corresponding availability information. The exchange unit will then use the corresponding availability information to select a communication terminal allocated to the selected group that has an availability information indicating that it is available.

Private branch exchanges, in particular for call centers or contact centers, can also be designed for data transmission via multimedia applications or also via an Internet Protocol. In such systems, Session Initiation Protocol (SIP) can be used to set-up a communication connection. In using SIP, prior to the set-up of a communication connection, the communication modalities are configured to be able to exchange data between the communication terminals involved, i.e. in particular the calling communication terminal and the intended target communication terminal. The calling communication terminal sends a start message to the desired target communication terminal in which a request of a connection set-up is transmitted. The start message can provide additional information as well. If the desired target communication terminal is available, in which case a communication connection shall be set up, the target communication terminal will transmit a corresponding confirmation message. The corresponding confirmation message can also transmit additional information. Based on the information contained in the start and confirmation messages exchanged, criteria for the communication connection to be properly set-up and status information on the present or future availability of the communication party or the like can be transmitted. The desired communication connection can then be set up.

When applying such a SIP technology in complex telephone systems, such as, call centers or contact centers, an individual SIP address is usually allocated to each communication terminal so that data can be exchanged to a particular communication terminal for initiating a communication connection. A communication terminal integrated in such a way in the communication network through SIP is also called "SIP end point." Each SIP end point is registered as a possible address for SIP messages.

When designing relatively complex telephone systems, in particular for call centers or contact centers, the service orientation or the achievement of a high customer satisfaction among the calling parties is of particular importance. If it is not possible, upon a customer's call, to immediately establish a contact to a correspondingly competent service employee, the calling party's wishes should be taken into account as much as possible, in view of a possible callback, a possible new call or the possibility of an automated inquiry. If a calling customer encounters the situation where no employee at the call center or contact center from the called service area is available, most call centers or contact centers usually switch over to a stored tape announcement, an answering machine, or the current call has to be interrupted temporarily. This can be unsatisfactory for the calling customers, in particular if their only option is a new call at a later time.

SUMMARY OF THE INVENTION

Therefore, the invention is to provide a method for setting up a communication connection where the calling party's wishes can be considered to a great extent with simple means, if currently no communication terminal from the called group is available. Furthermore, a well suited private branch exchange shall be provided for carrying out the method.

Where there is nonavailability of a service employee, the invention is directed to a method where a start message is transmitted from a calling communication terminal to a virtual communication terminal allocated to a group telephone number within a communication network.

A private branch exchange that uses SIP can provide a SIP end point to each of the existing communication terminals. Additionally, SIP end points can be created for related group telephone numbers. Such SIP end points related to group telephone numbers can be created, for example, through the creation of a virtual communication terminal on a central computer unit or on the server of the corresponding private branch exchange.

In this way, it is possible to transmit an appropriate availability or presence information to the calling party already as part of the initiating measures during connection set-up, i.e. during the preparatory exchange of inquiry and answer signals between calling party and called party. This availability or presence information is provided not only for the individual workstations or communication terminals, but also to groups within the communication network. In this way, for example, a calling party having dialed up the "Sales" function group of an enterprise, can be informed directly and without consulting the actually existing communication terminals, when the complete call center is occupied, business hours, or the like.

In addition, it is also possible to exchange preparatory information, such as, for example, a wish to be called back or the like, through the provided SIP end point, in a centralized and workstation-independent manner, without requiring an individual inquiry of the individual communication terminals or individual workstations or the set-up of a substitute call. The start message directed to the virtual communication terminal allocated to the group telephone number can be further processed in different ways. For example, if none of the communication terminals of the selected group is available, it can internally be examined whether as an alternative to the incoming connection request, a communication terminal of another, at least partially equivalent, group could be selected.

Further processing of the incoming start message is designed for transmitting to the calling party information on the present status of the private branch exchange or else an option for a future continuation of the call. For this purpose, the start message directed to the virtual communication terminal is advantageously answered by a status message on the availability of the communication terminals belonging to the selected group in the communication network. In an alternative or additional advantageous embodiment, a corresponding status message is sent to the calling communication terminal, when at least one of the communication terminals belonging to the selected group in the communication network becomes available.

Regarding the private branch exchange of the above-mentioned type, the above-mentioned task is solved by defining on the server, for exchanging start and status messages for the, or each, group of communication terminals, a virtual communication terminal allocated to the respective group telephone number.

The advantages achieved with the invention consist in particular that the individual SIP addresses assigned to each communication terminal and group within the communication network can adapt to a customer's wishes, prior to the actual set-up of a communication connection. This is done through the exchange of information prior to the set-up of a communication connection and enables a centralized management of customers' wishes without requiring an individualized recourse to the communication terminal.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

Preferred embodiments of the present invention are depicted in the accompanying drawing. Various features and advantages of these preferred embodiments will be better understood when the specification and claims are considered in conjunction with the accompanying drawing. It is understood that the scope of the invention is not limited by the precise features and arrangement illustrated herein.

DETAILED DESCRIPTION

Figure 1:
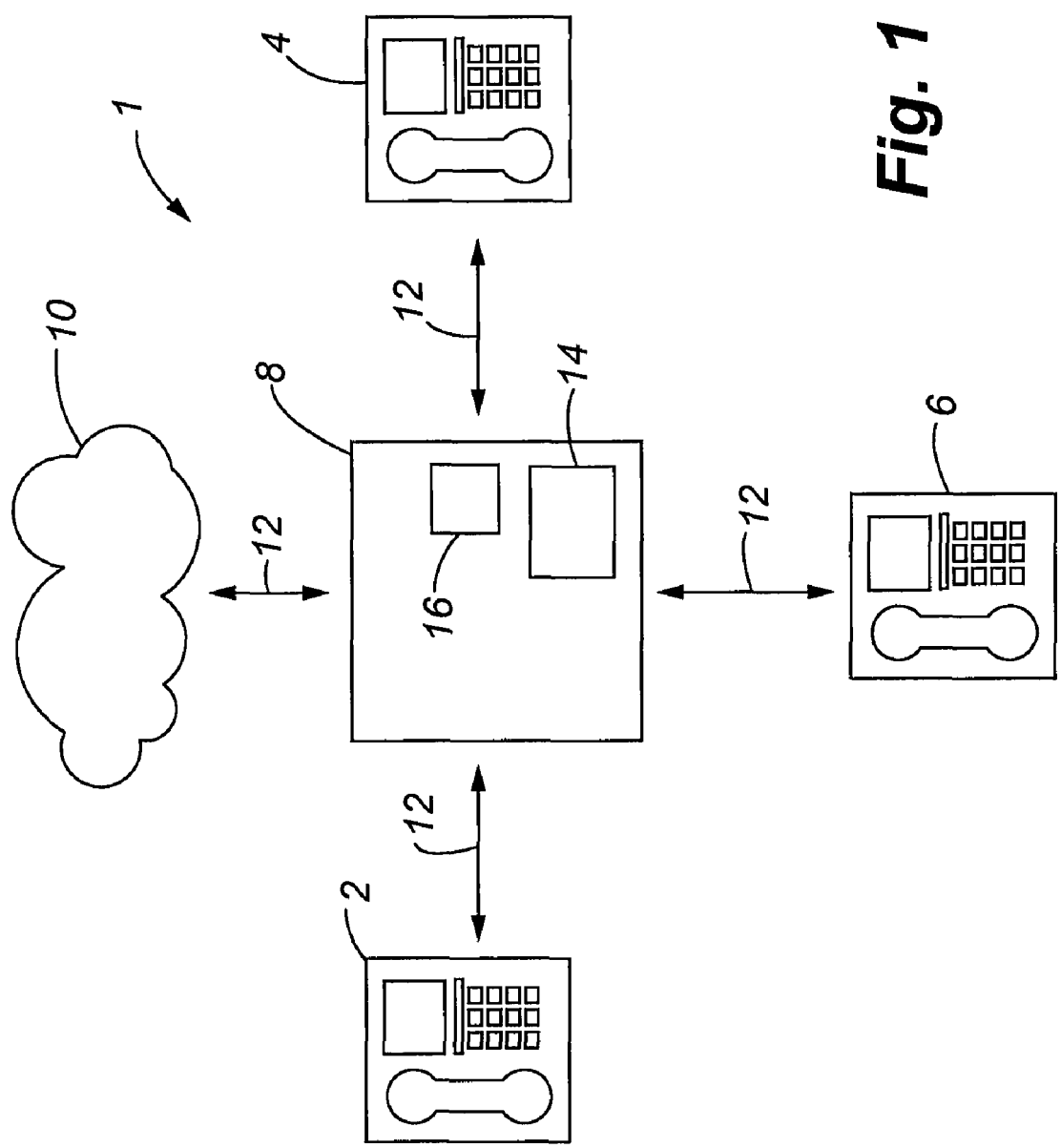
FIG. 1 illustrates a telephone system with a plurality of internal communication terminals connected a private branch exchange with a server, with the server being connected to an external telephone network.

An exemplary embodiment of the invention is explained in detail by means of a drawing in which the FIGURE is a schematic representation of a private branch exchange.

The telephone system 1 according to the FIGURE comprises a number of communication terminals 2, 4, 6, connected on the data side with a common server 8, also designated as telecommunication server. The server 8, in turn, is connected with an external telephone network 10. In the exemplary embodiment, the Internet Protocol is provided as the transmission medium, the server 8 being suitably connected via the Internet with the telephone network.

As indicated by the double arrows 12, the central server 8 is connected via suitable data or communication channels both with the external telephone network 10 and with the internal communication terminals 2, 4, 6. In operation of the private branch exchange 1, on the one hand, voice data or user data are exchanged with the communication terminals 2, 4, 6, which are exchanged in a suitable compressed and digitized form, in view of the utilization of the Internet Protocol provided in the exemplary embodiment. In addition to the voice data or user data, however, functional data, too, can be transmitted via the above-mentioned communication channels, by means of which special functions of the private branch exchange 1 are carried out. As special functions, the exemplary embodiment provides, in a quite usual design, in particular functions which can be activated by the individual users, such as, for example, call forwarding operations, functions of answering machines, call charge management or the like.

In addition, the private branch exchange 1 is designed by its structure for using the Session Initiation Protocol (SIP), the communication terminals 2, 4, 6 being defined as SIP end points and being separately and individually addressable, for preparing the set-up of a communication connection with one of the other communication terminals 2, 4, 6 or with another communication terminal which is externally accessible via the telephone network 10. By making use of the SIP concept, it is possible to exchange status information, for example concerning the individual availability of the respective user of the communication terminals 2, 4, 6, already during preparation of the connection set-up.

In addition, the communication terminals 2, 4, 6 are combined in the private branch exchange 1 in different groups, in dependence of their function or competence. When using the private branch exchange 1 as a contact center or call center a group of communication terminals 2, 4, 6 could be allocated, for example, to the functional unit "Sales". Alternatively, when using the private branch exchange 1 as an internal telephone system of an enterprise or the like, a group of the communication terminals 2, 4, 6 could be defined by their belonging to the "Personnel Division" or the like. To each of the groups of communication terminals 2, 4, 6 defined in this manner, to which, depending on the application, a far larger number of individual communication terminals can be allocated, an individual common telephone number, defined in dependence of function or competence, is allocated as the group telephone number, which, if required, can specifically be called by an external or also by an internal calling party.

For further illustration, it will in the following be assumed for the exemplary embodiment according to the FIGURE that the communication terminals 4, 6 are allocated to such a group and that a calling party, for example internally from communication terminal 2 or externally through the telephone network 10, wants to access the function or competence of this group, for example "Sales" or "Personnel Division". For this purpose, an exchange unit allocated to the corresponding group telephone number is provided in this group within the server 8, the connection requests characterized by selection of the respective group telephone number coming in at said exchange unit. As a function of an availability information transmitted through the corresponding data or communication channels with respect to the communication terminals 4, 6 belonging to the respective group, the exchange unit 14 will, when a connection request comes in, immediately determine which communication terminal 4, 6 of this group is currently available and will, if possible, set up a communication connection between the incoming call and the communication terminal 4, 6 recognized as available. The set-up of this connection is prepared having recourse to the SIP technology, whereby the status and information signals exchanged thereby can already be used for identifying the currently available terminal and thus for selecting the suitable communication terminal 4, 6.

Making consistent use of the SIP technology, the private branch exchange 1 is, however, in addition also designed for making it possible, even if at the moment a call comes in, none of the communication terminals 4, 6 allocated to the currently selected group should be available, to consider customers' wishes and the like to a particularly great extent. For that purpose, a virtual communication terminal 16 formed on the server 8 is allocated to the respective established group, said virtual communication terminal 16 being defined as an independent SIP end point. Consequently, a separate SIP end point, which is independent of the individual communication terminals 4, 6, is allocated to the group telephone number specified in dependence of function or competence, through which group-related information, in particular status information, can be handled within the framework of the SIP technology. If it is currently stored in the exchange unit 14 that at present none of the allocated communication terminals 4, 6 is available, an incoming start message signalizing the request of setting up a connection with a competent employee is directed to the virtual communication terminal 16.

Then, this message can be processed in view of satisfying the customer to the greatest possible extent. In particular, the start message directed to the virtual communication terminal can be answered by a status signal informing the calling party that at present none of the desired communication terminals 4, 6 is available, so that the calling party gets a corresponding group or function-related availability information already prior to the connection set-up. Furthermore, it is possible to already transmit in this way, within the framework of the data exchange during initiation of the connection, further functional or additional data, for example concerning the callback request or an information when a terminal will probably be available again. If the calling party calls, for example, outside the opening or business hours, he/she can be transmitted in this way, in a group or function-related manner, already prior to the connection set-up, a corresponding information on the relevant opening or business hours. Alternatively, the calling party can be inquired in a group or function-related manner about a possible callback request which can centrally be administered by the group-related recording.

In this way, the calling party can be provided, immediately and also in a manner adapted to his/her requirements, with an information on the possibilities of further processing of the request of his/her call, said information being representative in a particularly simple manner for the entire functional unit or organizational unit.

A number of variations and modifications of the invention can be used. It would be possible to provide for some features of the invention without providing others.

The exemplary systems and methods of this invention have been described in relation to STB's and profile(s). However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network 10, such as a LAN, cable network, and/or the Internet, or within a dedicated system. Thus, it should be appreciated, that the components of the system can be combined in to one or more devices, such as a STB, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, in one or more communications devices, at one or more users' premises, or some combination thereof. Similarly, one or more functional portions of the system could be distributed between a communications device(s), such as a STB, and an associated computing device. The one or more functional portions of the system could be also be installed in a TV or TV tuner card, such as those installed in a computer.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/ or equivalent structures, functions, ranges or steps are disclosed herein, and without intending to publicly dedicate any patentable subject matter.

LIST OF REFERENCE NUMBERS

1 Private branch exchange
2, 4, 6 Communication terminal
8 Server
10 Telephone network
12 Double arrows
14 Exchange unit
16 Communication terminal

The invention claimed is:

1. A method for setting up a communication connection comprising:
   a calling communication terminal and another communication terminal belonging to a group in a communication network, the group selected by a calling party dialing an allocated group telephone number;
   the other communication terminal being selected by an exchange unit of the communication network by means of an availability information,
   and the set-up of the connection being initiated through an exchange of a start message and a number of connection confirmation messages between the calling communication terminal and the selected other communication terminal, wherein, in case of nonavailability of all communication terminals belonging to the selected group of the communication network, a start message coming in from the calling communication terminal is directed to a virtual communication terminal allocated to the group telephone number.

2. A method according to claim 1, where the start message directed to the virtual communication terminal is answered by a status message concerning the availability of the communication terminals belonging to the selected group of the communication network.

3. A method according to claim 2, where a status message is sent to the calling communication terminal when at least one of the communication terminals belonging to the selected group of the communication network becomes available.

4. A private branch exchange which comprises:
   an exchange unit to which a plurality of communication terminals combined in groups are connected;
   a server designed for setting up communication connections with selected communication terminals through an exchange of a start message and a number of connection confirmation messages between a calling communication terminal and the respective selected communication terminal and designed for monitoring the availability of the communication terminals; and
   a virtual communication terminal allocated to a respective group telephone number being defined on the server for the exchange of the start and status messages for each group of communication terminals if all communication terminals of the respective group are not available.

* * * * *